United States Patent [19]

Nakayama

[11] Patent Number: 4,943,027
[45] Date of Patent: Jul. 24, 1990

[54] MOUNTING ARRANGEMENT FOR A VEHICLE AIR BAG

[75] Inventor: Yoshikazu Nakayama, Shiga, Japan
[73] Assignee: Takata Corporation, Tokyo, Japan
[21] Appl. No.: 328,838
[22] Filed: Mar. 27, 1989

[30] Foreign Application Priority Data

Mar. 29, 1988 [JP] Japan ................................. 63-73269

[51] Int. Cl.⁵ ............................................. F16M 13/00
[52] U.S. Cl. ..................................... 248/548; 248/900; 280/731; 280/743
[58] Field of Search ................ 248/548, 900; 280/728, 280/731, 743, 732, 730

[56] References Cited

U.S. PATENT DOCUMENTS

| | | | |
|---|---|---|---|
| 3,373,965 | 3/1968 | Bien et al. | 248/900 X |
| 4,183,550 | 1/1980 | Sudou | 280/731 X |
| 4,449,728 | 5/1984 | Pilatzki | 280/731 |
| 4,703,669 | 11/1987 | Hyodo | 248/548 X |
| 4,828,286 | 5/1989 | Fohl | 280/743 X |
| 4,836,576 | 6/1989 | Werner | 280/731 |
| 4,852,907 | 8/1989 | Shiraki | 280/743 X |
| 4,884,823 | 12/1989 | Honda | 280/731 |

FOREIGN PATENT DOCUMENTS

| | | | |
|---|---|---|---|
| 160757 | 6/1989 | Japan | 280/743 |
| 323851 | 1/1930 | United Kingdom | 248/548 |

Primary Examiner—J. Franklin Foss
Attorney, Agent, or Firm—Brumbaugh, Graves, Donohue & Raymond

[57] ABSTRACT

A mounting arrangement for a vehicle air bag comprises a mounting bracket affixed to a component of the vehicle, a base plate having a mounting portion on which an air bag and an inflator are mounted, and a plurality of fasteners connecting the base plate to the bracket. Plastically deformable structures associated with the fasteners and the base plate are arranged such that the mounting portion of the base plate is displaceable in a direction away from the mounting bracket in response to the forces imposed on the base plate at the end of the development of the air bag.

9 Claims, 7 Drawing Sheets

MOUNTING ARRANGEMENT FOR A VEHICLE AIR BAG

FIELD OF THE INVENTION

The present invention relates to a mounting arrangement for an air bag that is installed in a car or other vehicle and is inflatable at the time of a vehicle crash, whereby a passenger can be protected from serious injury.

BACKGROUND OF THE INVENTION

A conventional air bag device will now be described with reference to the accompanying drawings. FIG. 1 is a sectional view, in generally schematic form, of an air bag installation, and FIG. 2 is a perspective view of a base plate for the air bag. Numeral 1 is a part of a vehicle body, such as a steering wheel, on which an air bag device 3 is mounted on a bracket 2. The air bag device 3 includes a base plate 4, and disposed in an opening 5a on a surface 4a of the base plate 4 is an inflator 5. Further, the air bag device 3 comprises an air bag 6 which is placed in a folded condition and connected to the base plate 4 around the opening 5a so as to contain the inflator 5 in the air bag 6. The air bag device 3 also includes an air bag cover 7 which is connected to the base plate 4 so as to enclose the air bag 6. The base plate 4 is provided with four peripheral walls or flanges 4b having a plurality of holes 8 for receiving bolts that fasten it to the bracket 2.

At the time of the vehicle crash, the gas is introduced into the air bag 6 from the inflator 5, whereby the air bag 6 is inflated so as to pierce the cover 7. The air bag device 3 is mounted in a recessed or set-in position within the steering wheel 9 and upon inflation of the air bag prevents the passenger from colliding directly with the steering wheel.

As described above, the air bag is inflated by the gas jetting from the inflator. At the moment the air bag has ended inflation and reaches its maximum volume, an event that is hereinafter called "the end of development," a very high tensile stress is applied to a cloth material of the air bag. The inflation of the air bag stops rapidly at the end of development, and the inertia force and gas inflation pressure applied to the air bag cloth cause very high tensile stresses in the bag fabric. Therefore, a strong impact is imposed on the whole area of the air bag at the end of development.

To sustain the high forces, it is necessary to use very strong cloth for the air bag and to provide very strong stitching in its construction. In addition to high costs for material and labor, the sewn air bag is confronted with the following problems:

(1) At the end of development of the air bag, each space between adjacent stitches is large.
(2) The sewn bag employs a cloth coated with a rubber. To increase the strength of the seams, the hardness of the coated rubber is increased, so that the rubber-coated cloth is quite stiff. The stiffness of the bag prevents it from being folded into a desirably small volume.
(3) When the hardness of the rubber-coated cloth is high, there is the danger that the coated rubber may be cracked or stripped in case the bag is inflated when it is at a low temperature.

Also, with a conventional air bag device, there is the disadvantage that the steering wheel is deflected by the bag at the end of development of the air bag at the time of the vehicle crash, such that its ability to deflect further when the vehicle occupant collides with the bag is diminished. More specifically, as shown in FIG. 1, a top surface of the steering wheel 9 is spaced by a distance W from a top surface of the air bag device 3. Therefore, at the end of development, the bag is inflated, as shown by a dash-and-dotted line 6', and a force F causes the steering wheel 9 to be deflected forwardly. Accordingly, prior to impact of the occupant against the air bag 6, the steering wheel support arms 9a are deformed by the force F, so that the elastic deforming force of the arms 9a is not available to absorb the energy of the occupant's impact against the air bag.

As a result of a reaction of the force F, a high stress is applied to the structures that join the bag to the base plate and the base plate to the bracket 2. For example, a high force H is applied to the base plate 4 in a direction tending to separate the base plate 4 from the vehicle body 1. For this reason the base plate and the fastening structures must be of high-strength design, which makes them costly.

SUMMARY OF THE INVENTION

There is provided, in accordance with the present invention, a mounting arrangement for a vehicle air bag comprising a mounting bracket affixed to a component of the vehicle, a base plate having a mounting portion on which an air bag and an inflator are mounted, and a plurality of fasteners connecting the base plate to the bracket. The invention is characterized in that there are plastically deformable structures associated with the fasteners and the base plate arranged such that the mounting portion of the base plate is displaceable in a direction away from the mounting bracket in response to the forces imposed on the base plate at the end of the development of the air bag.

According to the invention the deformable structures can be of a variety of designs, as follows:

The deformable structures may be portions of the base plate located proximate to the fasteners and located and dimensioned to deform plastically. In one form of such an arrangement said portions of the base plate are mounting tabs oriented generally parallel to the direction of said forces, each tab has a hole receiving a fastener, and a portion of each tab between the fastener and the mounting portion of the base plate has holes defining plastically deformable segments of the tab that elongate in response to said forces. In a similar arrangement a portion of each tab between the fastener and the distal end has an opening into which deformable protrusions project, the protrusions being engageable and deformable by the fastener.

The deformable structures may be attachment clips having initially bent leg portions, the clips being fastened between the bracket and the mounting plate and the leg portions being plastically deformable to reduce or eliminate the bends in response to said forces.

In another arrangement the base plate has holes for the fasteners located in portions lying generally orthogonally to the direction of said forces, and there are slits in the base plate on opposite sides of each hole that define plastically extensible segments of the base plate.

The deformable structures may comprise a generally tubular, plastically deformable spacer received by a shank of each fastener and engaged between an abutment on each fastener and either the base plate or the mounting bracket. In one form the deformable spacers are tubes having slits defining a plurality of deformable strands, each strand being initially slightly bent and being adapted to bend further in response to said forces. In another form, the spacers are tubes that are engaged by abutments on the fasteners that have cam surfaces engaging the tubes such as to expand them in response to said forces.

As discussed above, at the end of the development of the air bag, a certain load H is applied to the base plate in a direction away from the bracket 2 and the vehicle body as a reaction to the force F on the steering wheel. The load H produces plastic deformation of the deformable structures associated with the base plate and the fasteners. The deformation absorbs energy and thereby reduces the stresses in the air bag fabric, the air bag stitching and the base plate, bracket and fastener. All of these elements of the air bag system can be of lesser strength and, therefore, lower cost. The force F applied to the steering wheel 9 is also reduced, so deflection of the wheel spokes or other supports is less. The ability of the steering wheel supports to deform is, accordingly, increased and the supports have a greater ability to absorb the energy of the impact of the vehicle passenger against the bag, which in turn imposes deforming forces on the steering wheel.

For a better understanding of the invention, reference may be made to the following description of exemplary embodiments, taken in conjunction with the accompanying drawings.

DESCRIPTION OF THE DRAWINGS

As described above.

FIGS. and 8A and 8B are detail cross-sectional views of another embodiment before and after deformation, respectively.

DESCRIPTION OF THE EMBODIMENTS

Figure 1:
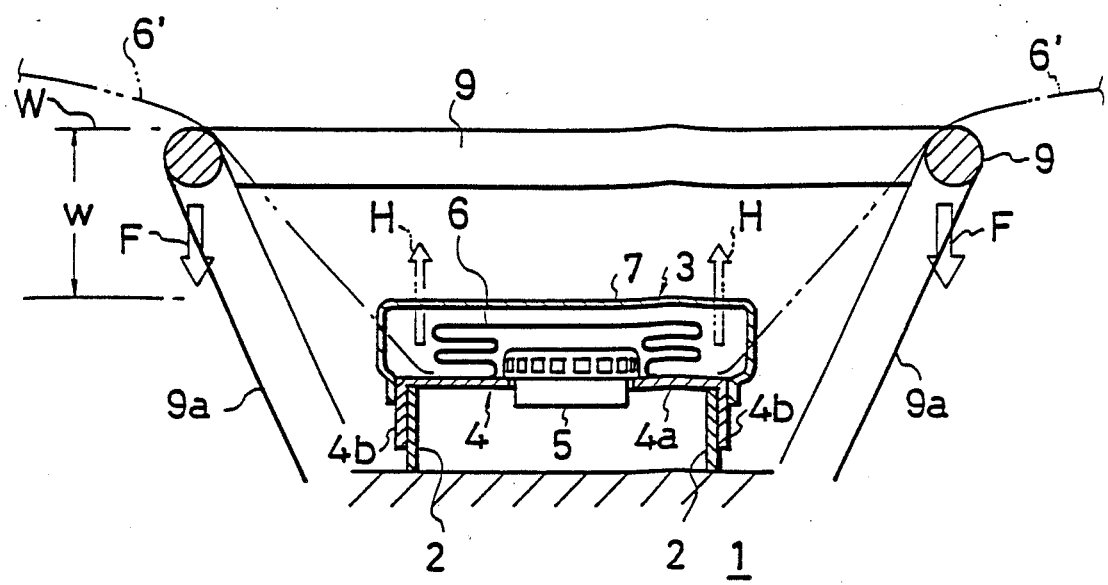
FIG. 1 is a transverse cross-sectional view of a prior art air bag device.
Figure 2:
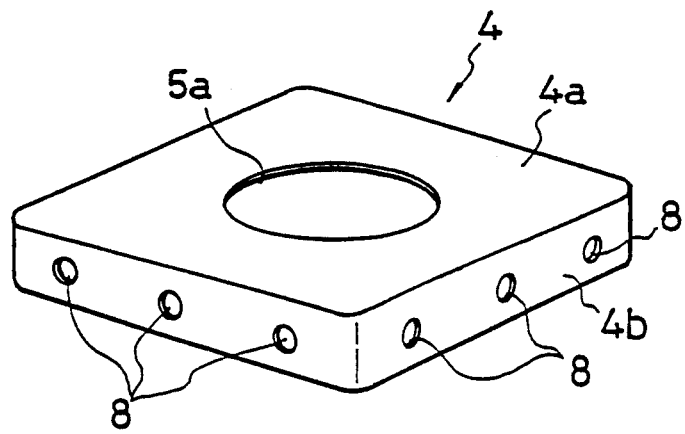
FIG. 2 is a pictorial view of the base plate of the device of FIG. 1.
Figure 3:
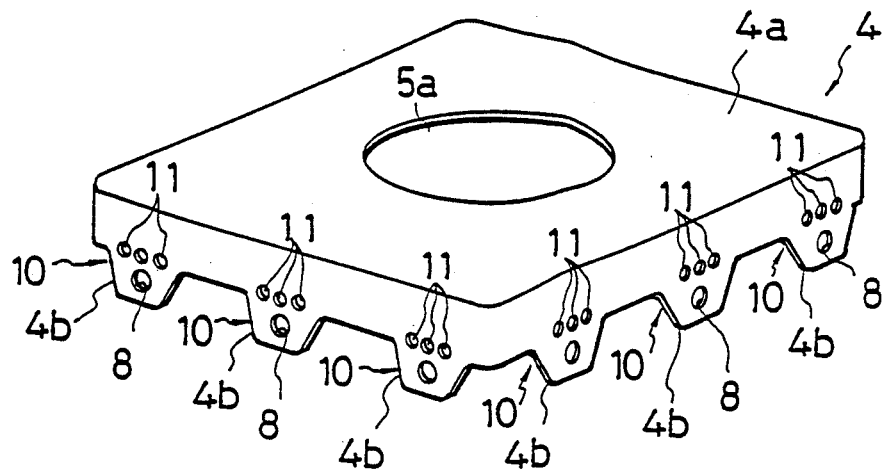
FIG. 3 is a pictorial view of a base plate according to a first embodiment of the invention.
Figure 3A:
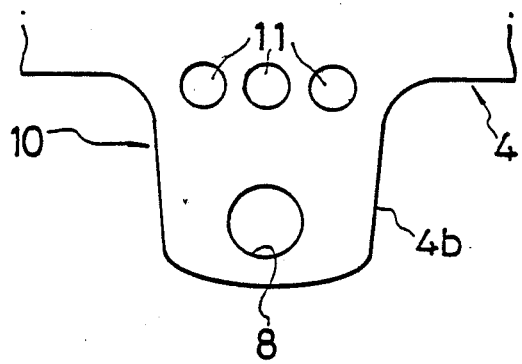
FIGS. 3A and 3B are elevational views of an attachment lug of the base plate of FIG. 3 in its initial and deformed conditions, respectively.
Figure 3B:
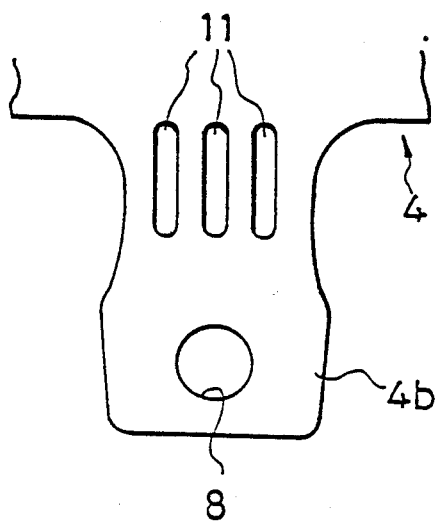

According to a first embodiment of the invention, as shown in FIG. 3, the base plate 4 (which is similar to the base plate shown in FIGS. 1 and 2) comprises a number of lugs 4b, each of which has one bolt hole 8, and a plurality of openings 11 along a flange portion 10 of a main body 4a. When the air bag device is actuated and the force H tending to detach the plate 4 from the vehicle body is applied to the base plate 4, the aforesaid portion 10 is plastically stretched or elongated, as shown in FIG. 3C, and the main body 4a is able to move in a direction away from the vehicle body.

Figure 4A:
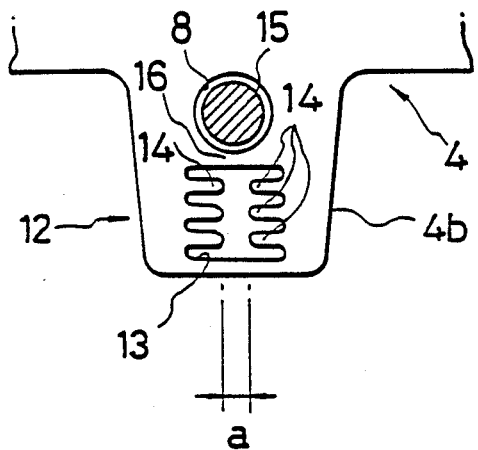
FIGS. 4A and 4B are detail elevational views of an attachment lug of another design in its initial and deformed conditions, respectively.
Figure 4B:
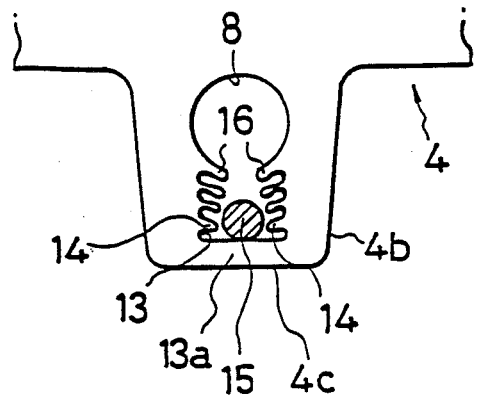

According to another embodiment of the invention, as shown in FIGS. 4A and 4B, an irregular shaped opening 13 is perforated below the bolt hole 8 in each lug 4b, namely on a lower portion 12 of the lug between the bolt hole 8 and the free end of the lug. The opening 13 is provided with a plurality of protrusions 14 which extend in a lateral direction into the opening. A space "a" between the ends of opposed protrusions 14 is predetermined to be smaller than a diameter of a bolt 15. According to this embodiment, when the force H away from the vehicle body is applied to the base plate 4, a portion 16 of the base plate between the opening 13 and the bolt hole 8 is ruptured by the bolt 15, and the base plate 4 is as a whole moves in a direction away from the vehicle body as shown in FIG. 4B. Since the space "a" between the opposite protrusions 14 is predetermined to be smaller than the diameter of the bolt 15, a certain load to deform the protrusions 14 is applied to the base plate 4 when it is moved in a direction away from the vehicle body. After rupture of the portion 16, the base plate 4 is moved relatively slowly in a direction away from the vehicle body, energy being absorbed in the process, so that the bolt 15 is prevented from heavily impacting against the bottom portion 13a of the opening from the bolt hole 8. Accordingly, the application of a large shear force to an edge 4c of the lug 4b is prevented.

Figure 5:
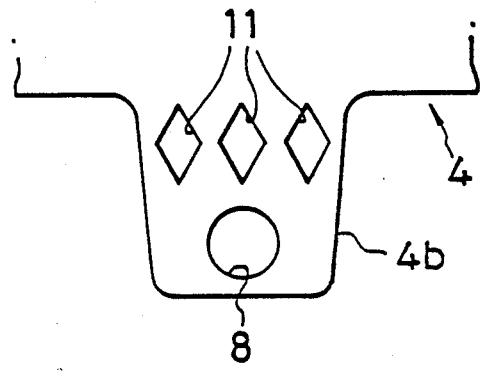
FIG. 5 is a detail elevational view of another design of an attachment lug.

The present invention is not limited to the aforesaid embodiments. For example, the shapes of the openings 11, 13 may be modified, such as illustrated by the diamond-shaped openings 11 shown in FIG. 5.

Figure 6A:
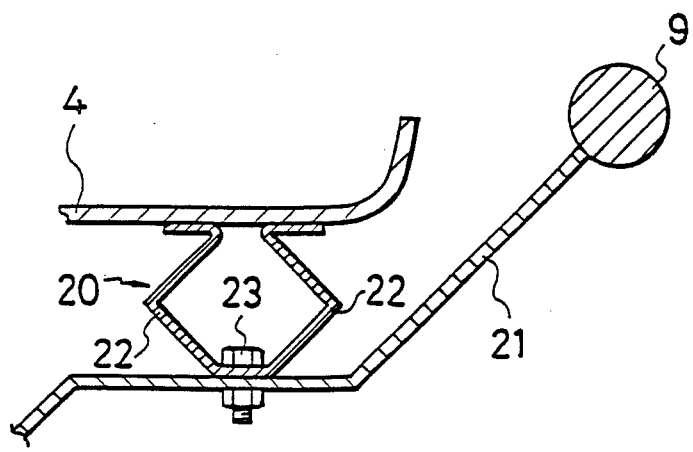
FIGS. 6A and 6B are cross-sectional views of another embodiment of the invention.
Figure 6B:
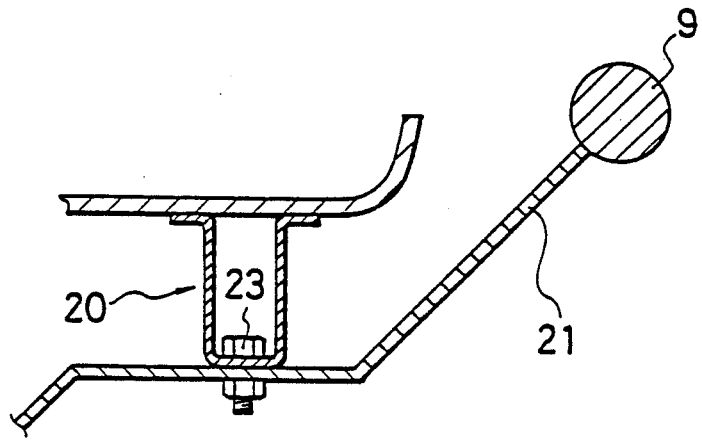

In the mounting structure of FIGS. 6A and 6B, the base plate 4 is joined to a steering wheel support member 21 by way of plastically stretchable attachment clips 20. (In this case, the steering wheel support 21 serves as the mounting bracket for the air bag device.) It will be understood that several clips 20 are used to join the base plate 4 to the support 21. The clips 20 are welded or otherwise fastened to the plate 4 and have pairs of bent V-shaped leg portions 22. When the load H is applied to the V-shaped leg portions 22, they are stretched to partly or fully straight conditions, as shown in FIG. 6B. Numeral 23 is a bolt for fastening the clip to the steering wheel support member 21.

Figure 7A:
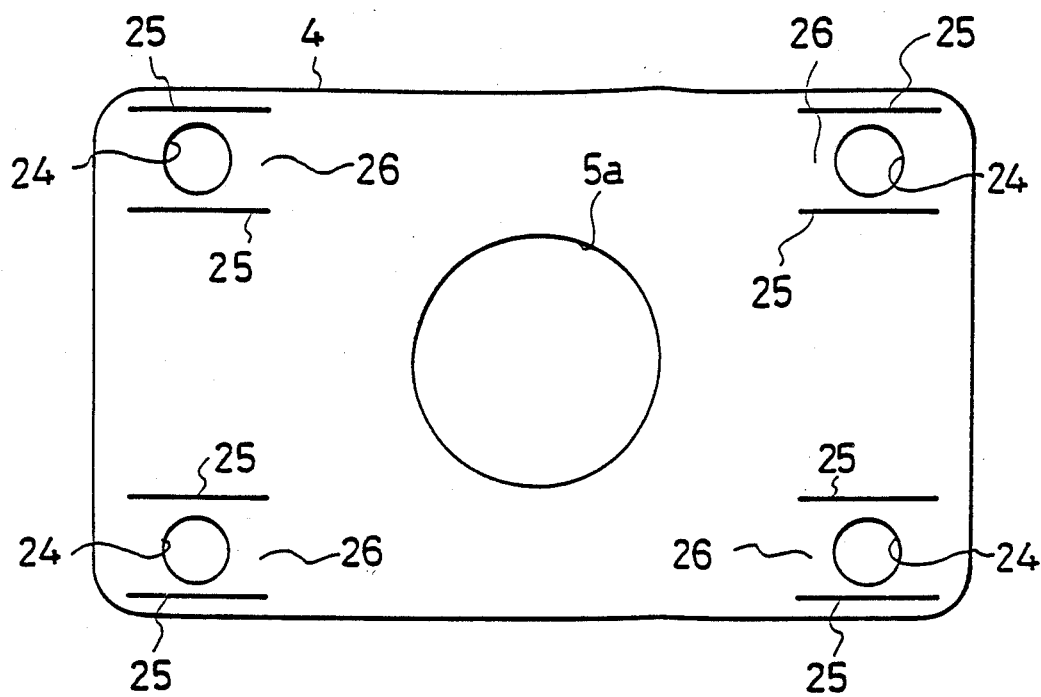
FIG. 7 is a top plan view of a base plate according to still another embodiment of the invention, and FIGS. 7A and 7B cross-sectional views of one of the attachment structures before and after deformation.
Figures 7B, 7C:
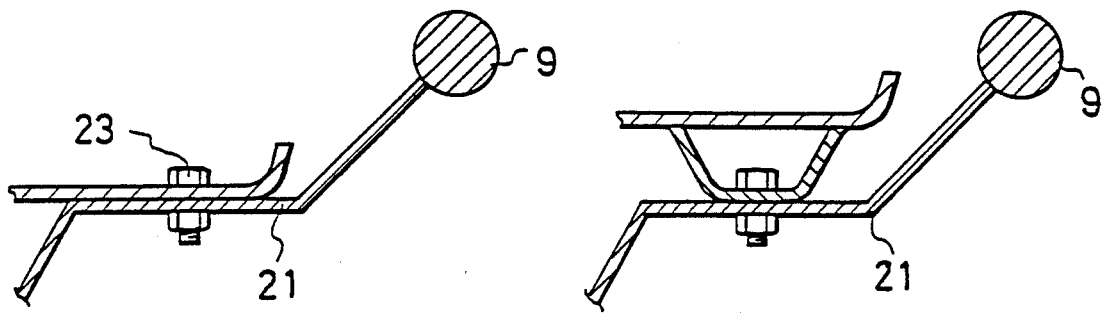

In the mounting structure for the base plate 4 shown in FIGS. 7A, 7B and 7C, the base plate 4 is fastened to the steering wheel member 21 by means of the bolts 23. A pair of slits 25 are formed on opposite sides of each bolt hole 24 and define a plastically extensible portion 26 adjacent each bolt. When the load H is applied to the base plate, each extensible portion is deformed, as shown in FIG. 7C. By forming a selected number of slits 25 of selected sizes and locations, the impact forces on a plurality of extensible portions 26 is buffered, and the rate of displacement of the base plate 4 away from the steering wheel support 21 is controlled.

Figure 8A:
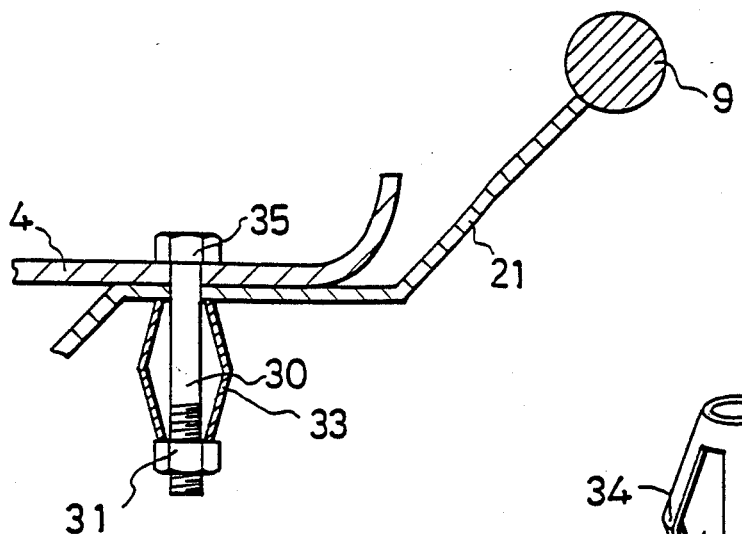
FIG. 8C is a pictorial view of a deformable, slit spacer tube of this embodiment.
Figure 8C:
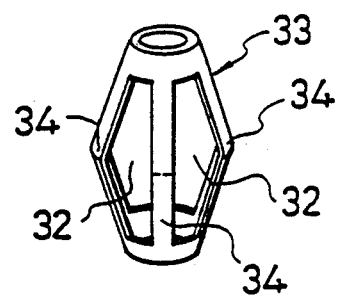
Figure 8B:
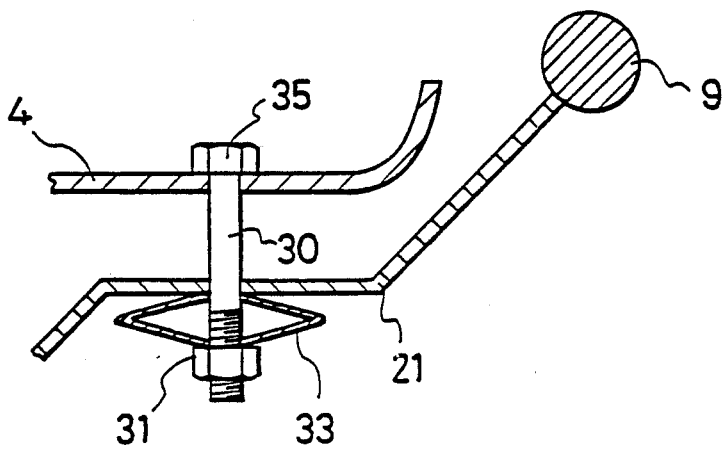

Referring to FIGS. 8A to 8C, the base plate 4 is connected to the steering wheel support member 21 by means of long bolts 30 and nuts 31. A tubular spacer 33 having a plurality of slits 32 (FIG. 8C) is mounted between each nut 31 and the support member 21, and the spacer 33 is fitted on the shank of the long bolt 30. The slits form lengthwise strands 34 of the spacer that are slightly bent initially. When the load H is applied to the spacers, the bent strands 34 between adjacent slits 32 are flexed, and the long bolts 30 are moved in a direction away from the steering member 21, which allows the base plate to likewise displace.

According to this embodiment, as shown, the spacer 33 having the slits 32 is positioned between the nut 31 and the steering wheel support member 21, but it may be mounted between the head 35 of the bolt 30 and the base plate 4.

Figure 9A:
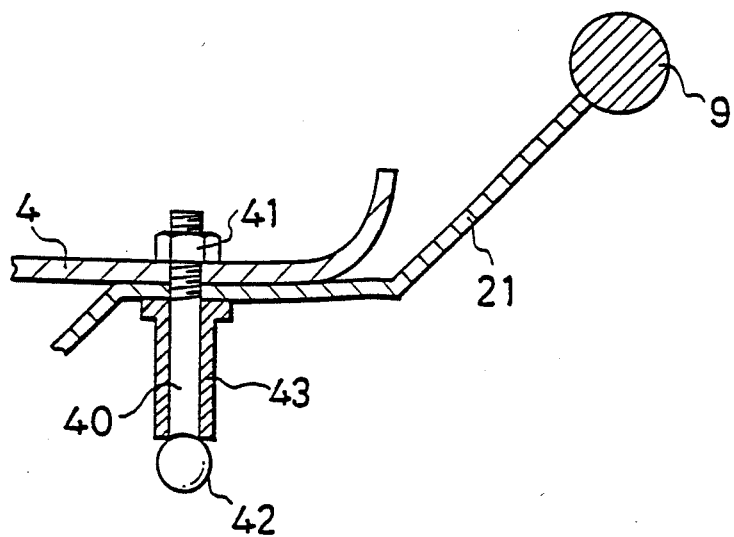
FIGS. 9A and 9B are detail cross-sectional views of yet another embodiment before and after deformation, respectively.
Figure 9B:
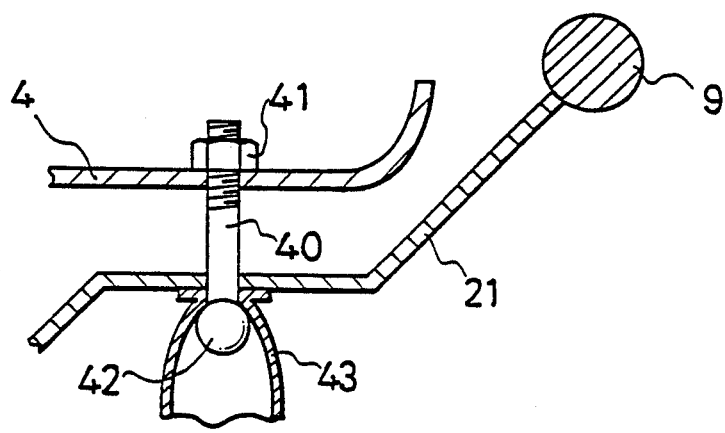

In the embodiment of FIGS. 9A and 9B, the base plate 4 is connected with the steering wheel support member 21 by means of a modified bolt 40 and a nut 41. The modified bolt 40 has a spherical head 42, and a tube 43 is mounted between the spherical head 42 and the member 21. The tube 43 is fitted over the shank of the bolt 40. When the load H is applied, the spherical head 42 is drawn forcibly into the interior of the tube 43 as shown in FIG. 9B, expanding the tube plastically and absorbing energy in the process. The base plate 4 displaces away from the member 21, as shown. The tube 43 may also be mounted between the nut 41 and the base plate 4. In this case, the nut 41 can be spherical like the head 42. Furthermore, the spherical head 42 (or the nut 41) may be modified to be of a conical shape so as to force its way into the tube 43. The spherical or conical elements may have flats for use with a wrench.

In FIGS. 8 and 9, the bolts move in directions nearly parallel to a steering column (not illustrated).

In each embodiment of FIGS. 6 to 9, when the load H is applied, the base plate 4 is moved in a direction away from the vehicle body and produces the same result as the embodiments of FIGS. 2 and 4.

The profile of the base plate is not limited to the embodiments illustrated in the appended drawings, and may be modified optionally to various configurations within the scope and spirit of this invention.

In all embodiments, the base plate is moved in a direction away from the vehicle body (e.g., the steering wheel support) at the developing time of the air bag, so that the maximum tensile stress applied to the air bag becomes smaller and the air bag requires less tensile strength. Accordingly, the cost of the air bag can be reduced. Furthermore, since the base plate is moved in a direction away from the vehicle body, the deformation of the steering wheel support is permitted after the end of the air bag development. Thus, when the passenger's body is thrust against the air bag, the steering wheel deflects, the impact upon the passenger is attenuated by energy absorption, and the safety of the passenger is increased.

Inasmuch as the maximum tensile stress applied to the air bag is reduced at the end of development of the air bag, the sound which occurs at the time when the air bag reaches the maximum tensile stress (a loud sound which occurs when the bag cloth is stretched rapidly) becomes smaller.

It is possible to use components of lesser strength for mounting the air bag on the base plate, and the base plate need not be as strong. The ability of the air bag device to resist detachment of the bag from the base plate is increased. Since the air bag cloth requires less strength, it may be a cloth coated with a soft rubber. Such a soft rubber has a better durability than a hard rubber, so that the air bag of this invention has a very good durability. Thus, a silicone rubber is also usable, whereby the durability of the air bag is improved greatly. In addition, by using such a soft rubber, it is possible to fold the bag into a smaller volume.

When the air bag is of seamed construction, the sewing cost can be reduced, the yarn stitching density can be less, and it is possible to make smaller the folded bag volume. It is also possible to increase the pitch between adjacent stitches, whereby the stitching speed can be faster, and the amount of stitching thread is less. Consequently, this invention contributes to the high productivity and low cost of the air bag.

I claim:

1. A mounting arrangement for a vehicle air bag comprising a mounting bracket affixed to a component of the vehicle, a base plate having a mounting portion on which an air bag and an inflator are mounted, and a plurality of fasteners connecting the base plate to the bracket, characterized in that there are plastically deformable structures associated with the fasteners and the base plate such that the mounting portion of the base plate is displaceable in a direction away from the mounting bracket in response to the forces imposed on the base plate at the end of development of the air bag.

2. A mounting arrangement according to claim 1 and further characterized in that the deformable structures are portions of the base plate located proximate to the fasteners and arranged to deform plastically.

3. A mounting arrangement according to claim 2 and further characterized in that said portions of the base plate are mounting tabs oriented generally parallel to the direction of said forces, in that each tab has a hole receiving a fastener and in that a portion of each tab between the fastener and the mounting portion of the base plate has holes defining plastically deformable segments of the tab that elongate in response to said forces.

4. A mounting arrangement according to claim 2 and further characterized in that said portions of the base plate are mounting tabs oriented generally parallel to the direction of said forces, in that each tab has a hole receiving a fastener, and in that a portion of each tab between the fastener and the distal end has an opening into which deformable protrusions project, the protrusions being engageable and deformable by the fastener.

5. A mounting arrangement according to claim 1 and further characterized in that the deformable structures are attachment clips having initially bent leg portions, the clips being fastened between the bracket and the mounting plate and the leg portions being plastically deformable to reduce or eliminate the bends in response to said forces.

6. A mounting arrangement according to claim 1 and further characterized in that the base plate has holes for the fasteners located in portions lying generally orthogonally to the direction of said forces and in that slits in the base plate on opposite sides of each hole define plastically extensible segments of the base plate.

7. A mounting arrangement according to claim 1 and further characterized in that the deformable structures comprise a generally tubular plastically deformable spacer received by a shank of each fastener and engaged between an abutment on each fastener and either the base plate or the mounting bracket.

8. A mounting arrangement according to claim 7 and further characterized in that the deformable spacers are tubes having slits defining a plurality of deformable strands, each strand being initially slightly bent and being adapted to bend further in response to said forces.

9. A mounting arrangement according to claim 7 wherein the abutments of the fasteners have cam surfaces engaging the tubes such as to expand them in response to said forces.

* * * * *